(12) United States Patent
Haubenstricker et al.

(10) Patent No.: US 11,731,684 B1
(45) Date of Patent: Aug. 22, 2023

(54) RECIRCULATING BALL TRACK TELESCOPE INTERFACE ASSEMBLY FOR STEERING COLUMN

(71) Applicant: Steering Solutions IP Holding Corporation, Saginaw, MI (US)

(72) Inventors: Kevin J. Haubenstricker, Frankenmuth, MI (US); Eric D. Pattok, Frankenmuth, MI (US); John S. Beam, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/679,276

(22) Filed: Feb. 24, 2022

(51) Int. Cl.
*B62D 1/185* (2006.01)
*F16C 29/04* (2006.01)

(52) U.S. Cl.
CPC .............. *B62D 1/185* (2013.01); *F16C 29/04* (2013.01)

(58) Field of Classification Search
CPC ................................ B62D 1/185; F16C 29/04
See application file for complete search history.

(56) References Cited

U.S. PATENT DOCUMENTS 2,791,894 A   5/1957   Duckworth

FOREIGN PATENT DOCUMENTS

| CN | 106741129 A | * | 5/2017 | ............ B62D 3/12 |
| CN | 113840769 A | * | 12/2021 | ............ B62D 1/185 |
| DE | 19735443 A1 | * | 2/1999 | ............ B62D 1/185 |
| DE | 102018200970 A1 | * | 7/2019 | |
| DE | 102019100139 A1 | * | 7/2020 | |
| EP | 0518091 A1 | * | 12/1992 | |
| EP | 0825091 A2 | * | 2/1998 | |
| EP | 1400711 A2 | * | 3/2004 | ............ B62D 1/185 |
| FR | 2467313 A1 | * | 4/1981 | |
| KR | 102208239 B1 | | 1/2021 | |
| WO | 2011139217 A1 | | 11/2011 | |
| WO | WO-2020234224 A1 | * | 11/2020 | ............ B62D 1/185 |
| WO | WO-2021209410 A1 | * | 10/2021 | |

OTHER PUBLICATIONS

English translation regarding Office Action for corresponding DE App. No. 10 2023 103905.9; dated Apr. 27, 2023.

* cited by examiner

*Primary Examiner* — Drew J Brown
(74) *Attorney, Agent, or Firm* — Dickinson Wright PLLC

(57) ABSTRACT

An axially adjustable steering column assembly includes a first support structure. The axially adjustable steering column assembly also includes a second support structure, wherein the first support structure is axially adjustable relative to the second support structure in a telescoping manner. The axially adjustable steering column assembly further includes a plurality of telescope interface assemblies disposed between the first support structure and the second support structure. Each of the telescope interface assemblies include a track formed in at least one of the first support structure and the second support structure. Each of the telescope interface assemblies also includes a plurality of metal balls disposed in the track to provide a rolling interface between the first support structure and the second support structure during axial adjustment therebetween.

14 Claims, 5 Drawing Sheets

RECIRCULATING BALL TRACK TELESCOPE INTERFACE ASSEMBLY FOR STEERING COLUMN

FIELD OF THE INVENTION

The embodiments described herein relate to vehicle steering systems and, more particularly, to a steering column with a recirculating ball track telescope interface assembly.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers. More recently, steering columns may be axially adjusted to be moved to a significantly retracted position, which may also be referred to as a "stowed" position.

Steering column assemblies typically have stringent requirements for natural frequency, stiffness, and telescope effort. A common telescope interface between jackets of a steering column is a "tube-on-tube" with an injected "tele-bushing". The tube-on-tube with a tele-bushing designs make it difficult to meet performance specifications for natural frequency, stiffness, and telescope effort. If the plastic is injected at high pressure, the stiffness improves, but the telescope effort gets worse (and vice versa). Telescope efforts can be further effected at differing temperatures due to the plastic bushing, the plastic injection material and the steel jackets all having differing coefficients of thermal expansion. If the performance specifications are stringent enough, a different more costly column design may be required.

SUMMARY

According to one aspect of the disclosure, an axially adjustable steering column assembly includes a first support structure. The axially adjustable steering column assembly also includes a second support structure, wherein the first support structure is axially adjustable relative to the second support structure in a telescoping manner. The axially adjustable steering column assembly further includes a plurality of telescope interface assemblies disposed between the first support structure and the second support structure. Each of the telescope interface assemblies include a track formed in at least one of the first support structure and the second support structure. Each of the telescope interface assemblies also includes a plurality of metal balls disposed in the track to provide a rolling interface between the first support structure and the second support structure during axial adjustment therebetween.

According to another aspect of the disclosure, a recirculating ball track telescope interface assembly for a steering column includes a first component formed of steel. The recirculating ball track telescope interface assembly also includes a second component formed of steel, wherein the first component is axially adjustable relative to the second component in a telescoping manner. The recirculating ball track telescope interface assembly further includes a closed path track formed in at least one of the first component and the second component. The recirculating ball track telescope interface assembly yet further includes a plurality of steel balls disposed in the track to provide a rolling interface between the first component and the second component during axial adjustment therebetween.

According to yet another aspect of the disclosure, a method of assembling an axially adjustable steering column assembly is provided. The method includes forming a track within one of an upper jacket and a lower jacket as a recessed portion. The method also includes installing a plurality of steel balls within the track. The method further includes inserting the upper jacket into a bore defined by the lower jacket for telescoping movement relative to the lower jacket.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
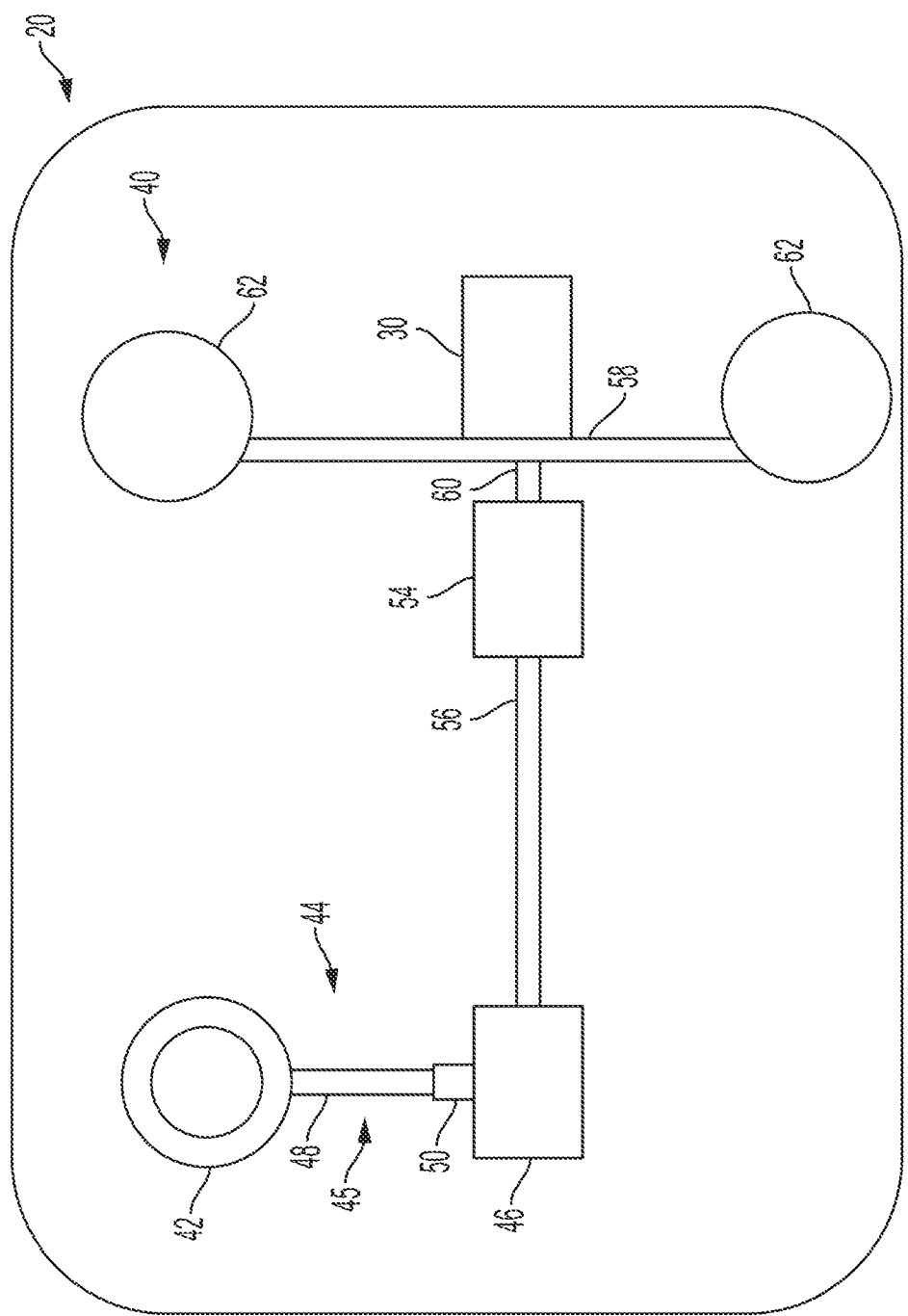
FIG. 1 schematically illustrates a steering system for a vehicle.

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions. In the past, a sole function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned completely away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode. The embodiments disclosed herein may be utilized in any steering column designed for telescopic axial adjustment, with or without stow capability.

Referring now to the Drawings, where the various embodiments are shown and described herein, without limiting same, a steering column assembly has axial adjustability resulting from relative movement between two or more steering column portions (also referred to herein as jackets) that permit axial movement therebetween. While jackets are discussed herein as the "portions" that result in the axial movement of the steering column assembly, it is to be appreciated that any structures which permit axial movement therebetween due to movement resulting from relative telescopic, sliding, or translational movement may be utilized as the described portions. Other examples include brackets, rails or the like. The term "portions" as used herein may also be interchangeably referenced as "support structures", such as an "outer support structure" and "an inner support structure", for example.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 includes a steering column 45 that extends along an axis from the input device 42 to an output assembly 46. The output assembly 46 may include a pinion shaft assembly, an I-shaft, a cardan joint, steer-by-wire components or any feature conventionally located opposite the input device 42.

The steering column 45 may include at least two axially adjustable portions, for example, a first jacket 48 and a second jacket 50 that are axially adjustable with respect to one another. It is contemplated that the overall steering column 45 may include more than the illustrated and described jackets 48, 50. The first portion 48 and the second portion 50 may be configured as jackets referred to as an upper jacket 48 and a lower jacket 50, respectively (or first support structure and second support structure, respectively). It is to be appreciated that other structural features of the steering column 45 may include brackets, rails, other devices, or combinations thereof.

The steering column 45 is moveable between a range of positions from an extended position to a retracted position. In the extended position, the first portion 48 is moved axially with respect to the second portion 50 so that the input device 42 is located near an operator of the vehicle. In the retracted position, the first portion 48 is moved axially with respect to the second portion 50 so that the input device 42 is located further away from an operator of the vehicle, when compared to the extended position. In some embodiments, the retracted position may correspond to stowing the input device 42. For example, it may be beneficial to place the input device 42 in a stowed location during autonomous driving. In operation, the axial movement between the first portion 48 and the second portion 50 may be effectuated by manual movement by an operator or electromechanically by a telescope actuator. This axial movement adjusts between the extended position, the retracted position, and any intermediary positions.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 includes an output component that interacts with a rack or other component that controls motion and position of the road wheels 62. This is the case for a mechanical connection being made throughout the steering column, but it is to be appreciated that the output assembly 46 is part of a steer-by-wire system that is in electrical communication with the steering gear assembly 54 to control the road wheels 62.

Figure 2:
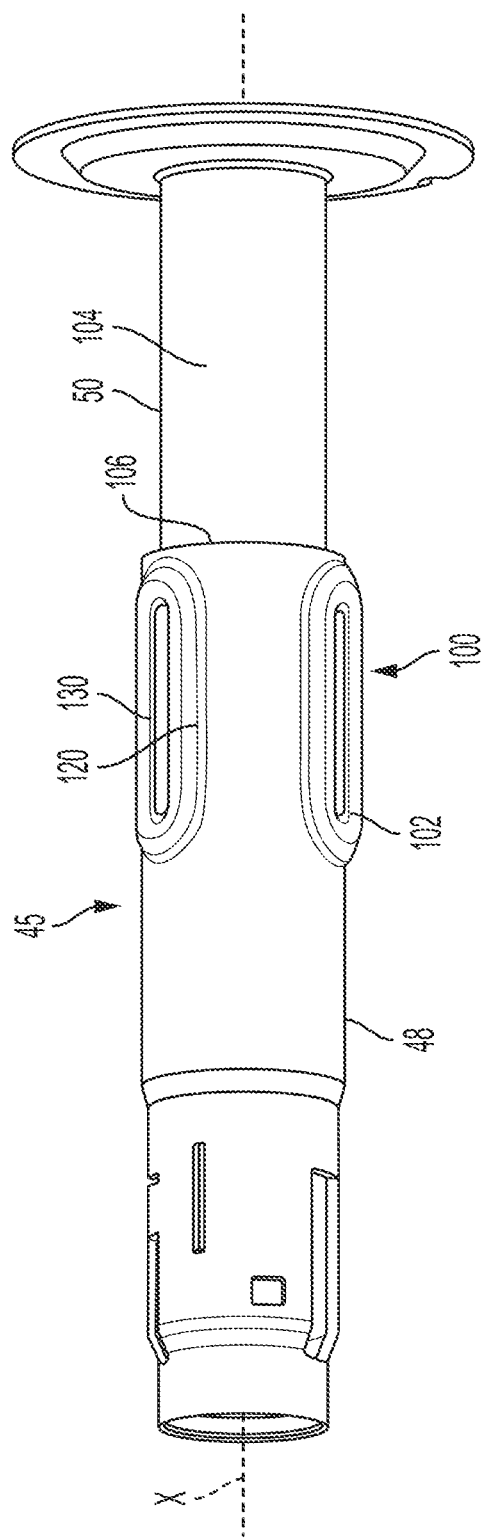
FIG. 2 is a side, elevational view of a portion of a steering column of the steering system with a recirculating ball track telescope interface assembly.
Figure 3:
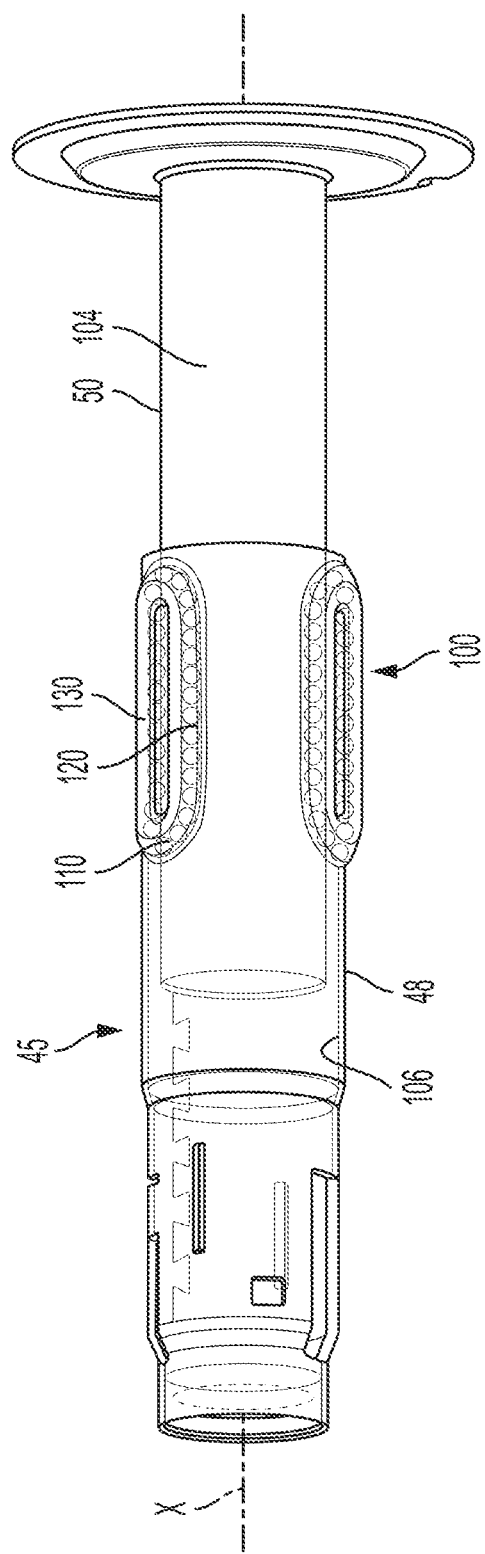
FIG. 3 is a side, elevational view of a portion of a steering column of the steering system with a recirculating ball track telescope interface assembly with ball bearings installed.

With reference now to FIGS. 2 and 3, a portion of the steering column assembly 44 is illustrated in greater detail. In particular, the first jacket 48 and the second jacket 50 are shown relative to each other. As described herein, the steering column 45 is axially adjustable to move the steering column 45 between the extended position and the retracted position. The axial adjustment may be carried out manually by an operator in some embodiments or may be done electromechanically with an actuator. In the illustrated embodiment, the jackets 48, 50 extend longitudinally about a common axis X, with the first jacket 48 radially surrounding the second jacket 50 during axial adjustment of the steering column 45. However, although illustrated and described with the first jacket 48 surrounding the second jacket 50, it is to be appreciated that the reverse configuration may be utilized in other embodiments.

As shown in FIG. 2, a recirculating ball track telescope interface assembly 100 is illustrated. The telescope interface assembly 100 provides a rolling interface between the upper jacket 48 and the lower jacket 50 during axial, telescoping adjustment of the steering column 45. The telescope interface assembly 100 is positioned at an axial location of the steering column 45 that encompasses a full range of designated axial travel for the steering column 45 (i.e., full extension to full retraction). As will be appreciated from the description herein, the telescope interface assembly 100 may also be referred to as a ball circuit.

The telescope interface assembly 100 comprises at least one track 102 configured to retain a plurality of balls 110. The at least one track 102 is shown empty in FIG. 2 and with the balls 110 installed in FIG. 3. In the illustrated embodiment, at least a portion of two tracks 102 is shown, and a third track (not shown) is on the opposing side of the steering column 45. In such an embodiment, the tracks 102 are circumferentially spaced from each other. In some embodiments, the tracks may be spaced equidistantly (e.g., 120 degrees centerline-to-centerline), while other embodiments may have different circumferential spacing. Furthermore, the number of tracks 102 may differ in some embodiments. Regardless of the number of tracks 102 or the spacing of such tracks, each track 102 substantially forms a closed path, such as an oval, circle or the like. In FIGS. 2 and 3, an oval shape is shown. In some embodiments, the balls 110 of each track 102 travel in a common direction (e.g., clockwise or counter-clockwise), while in other embodiments the balls 110 of one track 102 travel in a different direction than at least one other track 102. The loading characteristics of the ball circuits may dictate the directions of travel for each track 102.

The track(s) 102 may be formed in the upper jacket 48, the lower jacket 50, or a combination of the jackets. For example, the upper jacket 48 may have a radially outer surface 104 that is formed with a recessed track portion therein. Alternatively, the upper jacket 48 may have a radially inner surface 106 that is formed with a recessed track portion therein. As yet another alternative, the radially outer surface 104 of the lower jacket 50 and the radially inner surface 106 of the upper jacket 48 may both have recessed portions that form the track 102 in combination. The track(s) 102 can be formed into the jacket(s) 48, 50 at a stamping stage of the process. By integrating the track(s) 102 into the jacket(s) 48, 50 at stamping minimizes cost, as well as part count, by avoiding the need for subsequent process steps or additional telescope interface assembly components. While stamping is one example of the manufacturing method utilized to form the track(s) 102 into the first and/or second jacket, other manufacturing methods are contemplated. For example, the track(s) 102 may be machined into the surface(s). Other methods may be suitable in addition to those explicitly disclosed herein.

The plurality of balls 110 disposed in the track(s) 102 are formed of metal, such as steel, as are the upper and lower jackets 48, 50. Therefore, the friction associated with the rolling contact interface between the balls 110 and the jackets 48, 50 is low, when compared to column telescope interfaces that include components formed of different materials. The low friction ensures that maintaining a low telescope effort associated with axial adjustment of the column is feasible for an operator or during automated adjustment. Additionally, the coefficients of thermal expansion of the interfacing components—i.e., jackets 48, 50 and balls 110—is similar or identical since they are all formed of metal, such as steel. This further ensures a low telescope effort which may otherwise be impacted and be inconsistent due to thermal effects. The radial interference between the balls 110 and the jackets 48, 50 can be high due to the low friction, rolling nature of the interface, which improves natural frequency and increases stiffness of the overall steering column 45.

In some embodiments, the jackets 48, 50 are formed predominantly of a non-metal material, such as plastic, for example. However, a metal (e.g., steel) interface between the balls 110 and the jacket surfaces is maintained with metal inserts strategically located along the surface locations of the jackets 48, 50. In other words, the tracks 102 are formed with metal inserts in such an embodiment.

Figure 4:
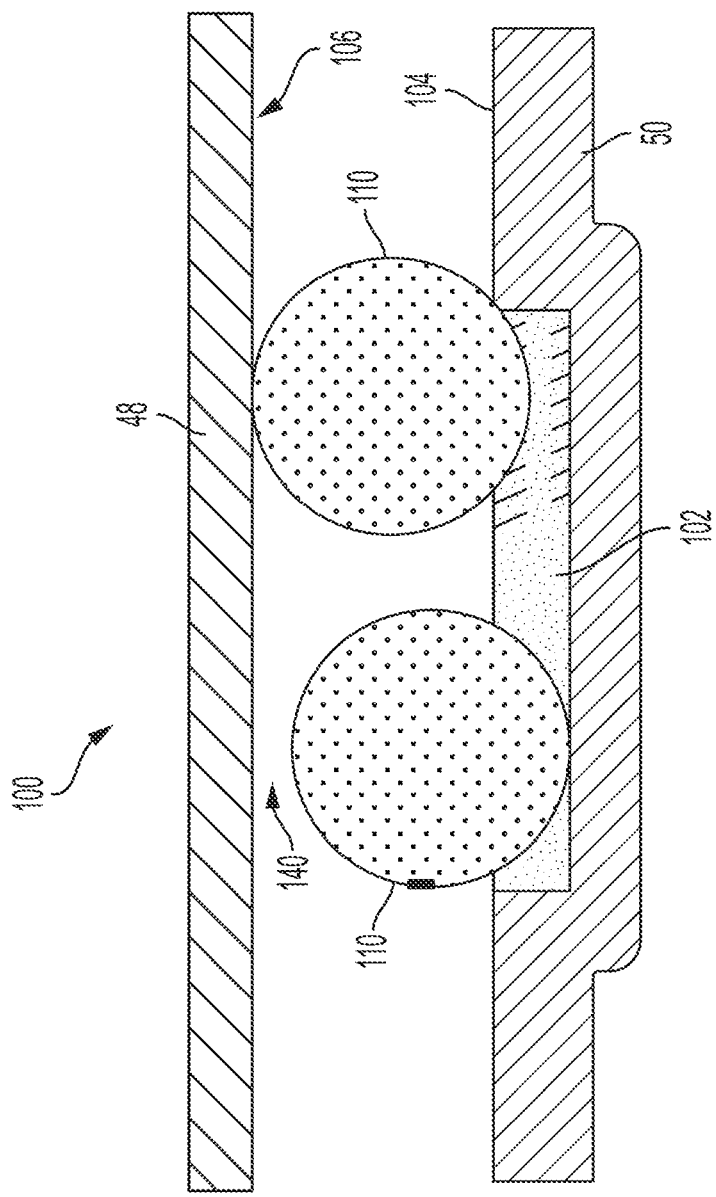
FIG. 4 is an elevational, cross-sectional view of a portion of the recirculating ball track telescope interface assembly.
Figure 5:
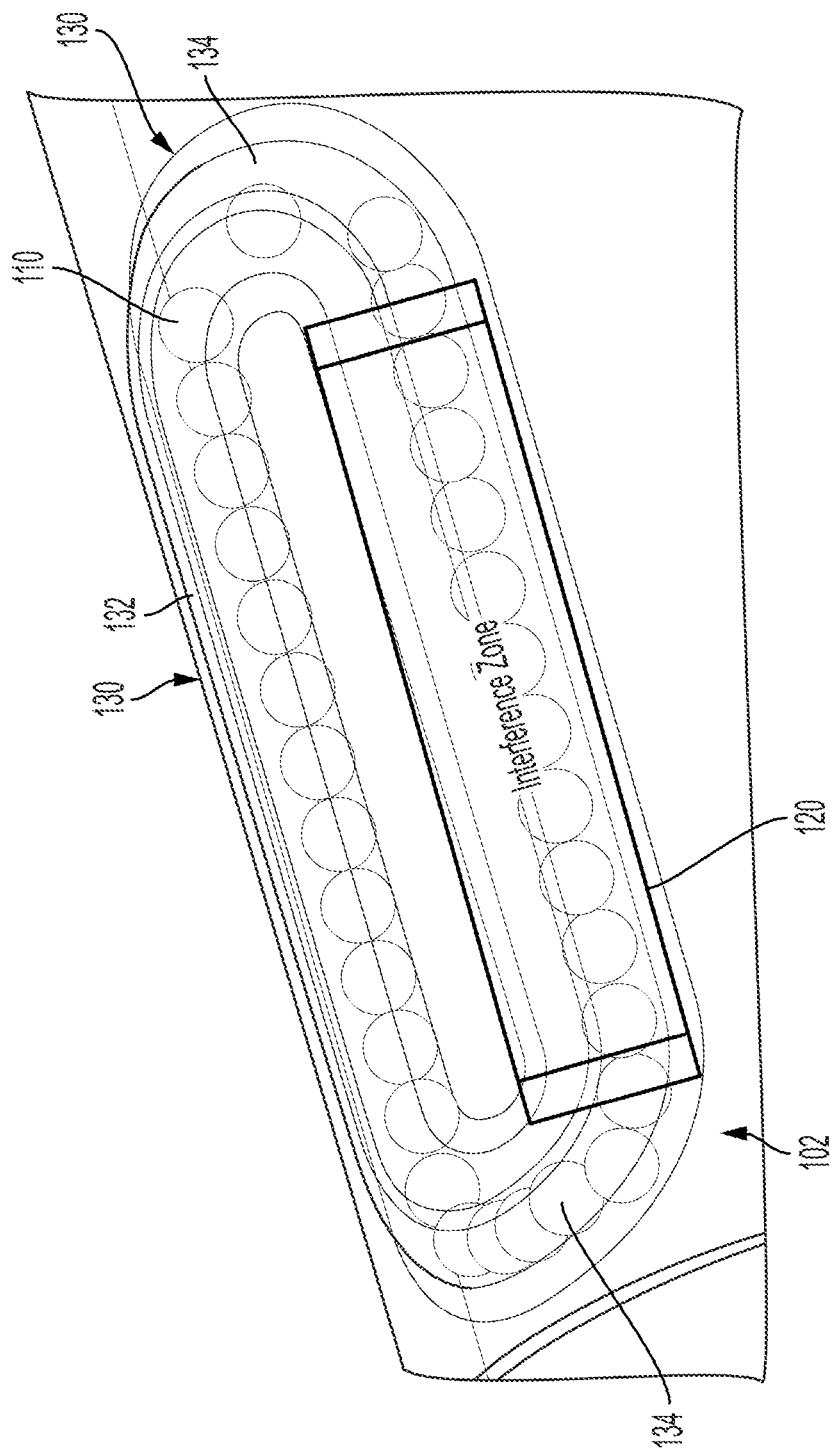
FIG. 5 is a perspective view of the recirculating ball track telescope interface assembly.

Referring now to FIGS. 4 and 5, an enlarged view of a portion of the telescope interface assembly 100 is illustrated. As shown, the balls 110 are disposed within the track 102 and located between the upper jacket 48 and the lower jacket 50. Along a first portion 120 of the track 102, the balls 110 are considered "loaded", which is defined as a position of the balls 110 that places the balls in contact with both jackets 48, 50. Along a second portion 130 (FIG. 5) of the track 102, the balls 110 are considered "unloaded", which is defined as a position of the balls 110 that results in a radial clearance 140 between the balls and one of the jackets 48 or 50 (e.g., clearance from upper jacket 48 in FIG. 4, but converse could be true). The difference is radial position is based on a difference in radial position between the first portion 120 of the track 102 and the second portion 130 of the track 102. Referring again to FIGS. 2 and 3, the first portion 120 of the track 102 corresponds to one of the straightaway segments of the track 102, while the second portion 130 of the track corresponds to the other straightaway segment 132 of the track and the curved end portions 134 of the track 102. In other words, the balls 110 are in contact with both jackets 48, 50 along the straightaway segment which is referenced as the first portion 120. The balls are in clearance with one of the jackets 48 or 50 along the other straightaway segment 132 and the curved end portions 134 which are collectively referenced with numeral 130. However, in some embodiments the balls 110 are in contact with both jackets 48, 50 along all or a portion of the curved end portions 134.

The embodiments disclosed herein provide metal (e.g., steel) upper and lower jackets 48, 50, with metal balls 110 therebetween, to provide a sliding interface for telescope adjustability of the steering column 45. It is to be understood that the sliding interface discussed herein relates to support structures that surround the steering shaft assembly. The steering shaft assembly is the portion of the overall system that transmits torque to enable steering maneuvers, while the support structures surround that torque transmitting portion. The recirculating ball paths (i.e., track 102 and balls 110) of the telescope interface assembly 100 allow "loaded" balls to support the jacket-to-jacket interface while providing low friction and high stiffness.

The embodiments disclosed herein eliminate the need for a dedicated ball retention component located between the first and second portion 48, 50. For example, many prior assemblies that facilitate relative translation of jackets or support structures in steering columns require a bushing, cage or sleeve that retains the metal balls 110. Such a component adds part count and cost to the assembly. The assembly described herein does not include such a ball retention component. Therefore, the embodiments disclosed herein advantageously reduce cost by providing the track 102 directly in or on the surfaces of the first and/or second portion 48, 50.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

What is claimed is:

1. An axially adjustable steering column assembly comprising:
   a first support structure;

a second support structure, wherein the first support structure is axially adjustable relative to the second support structure in a telescoping manner; and a plurality of telescope interface assemblies disposed between the first support structure and the second support structure, each of the telescope interface assemblies comprising:

a track formed in at least one of the first support structure and the second support structure; and a plurality of metal balls disposed in the track to provide a rolling interface between the first support structure and the second support structure during axial adjustment therebetween, wherein the first support structure, the second support structure and the plurality of metal balls are each formed of steel, wherein each of the plurality of balls is in contact with the first support structure and the second support structure while in a first portion of the track, and wherein each of the plurality of balls is in clearance with one of the first support structure and the second support structure while in a second portion of the track.

2. The axially adjustable steering column assembly of claim 1, wherein the track is formed as a recessed portion of a radially inner surface of the first support structure.

3. The axially adjustable steering column assembly of claim 1, wherein the track is formed as a recessed portion of a radially outer surface of the second support structure.

4. The axially adjustable steering column assembly of claim 1, wherein the track is formed as a combination of a recessed portion of a radially inner surface of the first support structure and a recessed portion of a radially outer surface of the second support structure.

5. The axially adjustable steering column assembly of claim 1, wherein the plurality of telescope interface assemblies consists of at least three telescope assemblies.

6. The axially adjustable steering column assembly of claim 5, wherein the at least three telescope assemblies are circumferentially spaced equidistantly around the first support structure.

7. The axially adjustable steering column assembly of claim 5, wherein the at least three telescope assemblies are circumferentially spaced non-equidistantly around the first support structure.

8. The axially adjustable steering column assembly of claim 1, wherein the track of each telescope interface assembly comprises a first straightaway segment, a second straightaway segment and a pair of curved end segments to form a closed path for recirculation of the balls, wherein the surface of the first straightaway segment and the surface of the second straightaway segment have different radial positions to define different radial positions for the balls at different locations along the track, wherein the balls are in contact with the first support structure and the second support structure when positioned within the first straightaway segment, wherein a radial clearance is defined between the balls and one of the first support structure and the second support structure when positioned within the second straightaway segment.

9. The axially adjustable steering column assembly of claim 8, wherein the balls are in contact with the first support structure and the second support structure along at least a portion of the curved end segments.

10. A recirculating ball track telescope interface assembly for a steering column comprising:

a first component formed of steel;

a second component formed of steel, wherein the first component is axially adjustable relative to the second component in a telescoping manner;

a closed path track formed in at least one of the first component and the second component; and a plurality of steel balls disposed in the track to provide a rolling interface between the first component and the second component during axial adjustment therebetween.

11. The recirculating ball track telescope interface assembly of claim 10, wherein the track comprises a first straightaway segment, a second straightaway segment and a pair of curved end segments for recirculation of the balls.

12. The recirculating ball track telescope interface assembly of claim 11, wherein the surface of the first straightaway segment and the surface of the second straightaway segment have different radial positions to define different radial positions for the balls at different locations along the track, wherein the balls are in contact with the first component and the second component when positioned within the first straightaway segment, wherein a radial clearance is defined between the balls and one of the first component and the second component when positioned within the second straightaway segment.

13. The recirculating ball track telescope interface assembly of claim 10, wherein the track is formed as a recessed portion of at least one of the first component and the second component.

14. The recirculating ball track telescope interface assembly of claim 10, wherein a bushing, cage or sleeve is not disposed between the first component and the second component.

* * * * *